United States Patent Office 3,056,836
Patented Oct. 2, 1962

3,056,836
ARALKYLAMINES AND METHODS OF PREPARATION THEREOF
Hendrik Durk Moed, Van Houtenlaan, Weesp, Netherlands, assignor to North American Philips Company, Inc., New York, N.Y., a corporation of Delaware
No Drawing. Filed Dec. 19, 1960, Ser. No. 76,528
Claims priority, application Netherlands May 28, 1955
6 Claims. (Cl. 260—570.7)

This application is a continuation-in-part of applicant's copending application Serial No. 538,812, filed October 5, 1955 and now abandoned.

The instant application is concerned with novel aralkylamines of pharmacological value and to methods of preparing such aralkylamines.

According to the invention I have synthesized a new and novel group of aralkylamines which have utility as vasodilators.

According to my invention I have synthesized novel aralkylamines of the formula

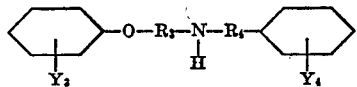

wherein $R_3$ represents an alkylene radical containing from 2 to 6 carbon atoms, $R_4$ represents a bivalent radical selected from the group consisting of bivalent alkylene radicals containing from 2 to 6 carbon atoms and monohydroxy derivatives of such radicals and $Y_3$ and $Y_4$ each represent a radical selected from the group consisting of hydrogen and from one to two hydroxyl, lower alkoxy, phenyloxy, benzyloxy and acetyloxy radicals, at least one of the radicals represented by $Y_3$, $Y_4$ and $R_4$ containing oxygen.

Examples of radicals that may be represented by $R_3$ in these compounds are the ethylene, propylene, butylene, tertiary butylene, isopropylene, pentylene and hexylene radicals.

Examples of radicals represented by $R_4$ are the ethylene, propylene, butylene, isopropylene, amylene, hexalylene radicals and monohydroxy derivatives of such radicals.

Examples of radicals represented by $Y_1$ and $Y_2$ are the hydrogen, hydroxy, acetyloxy, alkoxy radicals containing from 1 to 6 carbon atoms such as the methoxy, ethoxy, butoxy and hexyloxy, phenyloxy and benzyloxy radicals.

Preferred radicals represented by $R_3$ are the hydrogen, ethylene and isopropylene radicals.

Preferred radicals represented by $R_4$ are the above mentioned radicals in which $R_4$ represents a monohydroxylized alkylene group in which the hydroxy group is attached to the carbon atom alpha to the phenyl ring for example the

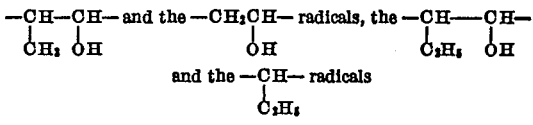

$Y_1$ preferably represents hydrogen and $Y_2$ preferably represents the hydroxy, methoxy, and benzyloxy radicals all in the para position.

These novel compounds and their pharmaceutically acceptable addition salts such as the hydrochloride, benzoate, bicarbonate, citrate, formate, hydroiodide, hydrobromide, lactate, phosphate, salicylate, tartrate and hydrobromide addition salts have utility as vasodilators and are useful in the alleviation of vascular disorders caused by arteriosclerosis obliterans, Burger's disease, Raynaud's phenomenon, acrocyanosis, scleroderma, thrombophlebitis and other ailments effecting the blood vessels.

The compounds of the invention are particularly useful in that while they are effective vasodilators unlike Dilatol they have little or no effect on the heart beat frequency or on the blood pressure.

Among the compounds of this invention that I have prepared are the following:

1 - (p - hydroxyphenyl) - 2-(1'-methyl-2'-phenoxyethylamino)-propanol-1 having the structural formula

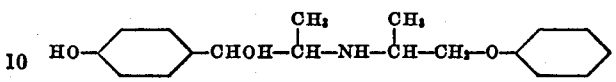

1 - (p - hydroxyphenyl) - 2 - methyl - 2 - ($Y^1$ methyl-$2^1$-phenoxy ethylamino) ethane having the structural formula

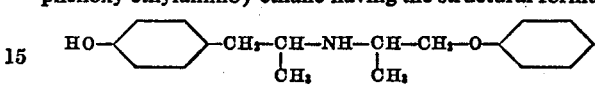

1 - phenyl - 2 - ($1^1$ - methyl - $2^1$ - phenoxy ethylamino) propanol having the structural formula

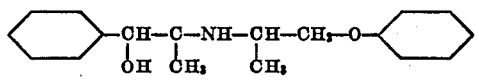

1 - (p - hydroxyphenyl) - 2 - ($2^1$ - phenoxy ethylamino) propanol-1 having the structural formula

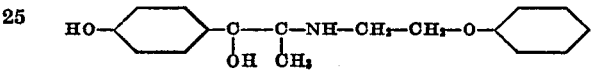

1 - (p - hydroxyphenyl) - 2 - [$1^1$-methyl-$2^1$-(p-hydroxyphenoxy) ethylamino]-propanol-1 having the structural formula

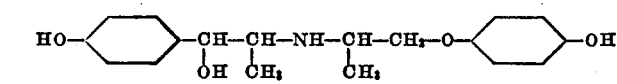

1 - ($3^1$, $4^1$ - dihydroxyphenyl) - 2 - ($1^1$ - methyl - $2^1$-phenoxy ethyl amino)-ethanol-1 having the structural formula

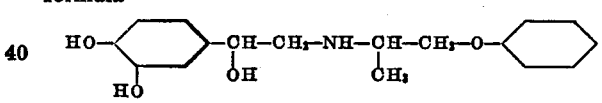

1 - (p - hydroxyphenyl) - 2 - ($4^1$-phenoxy butyl amino)-propanol-1 having the structural formula

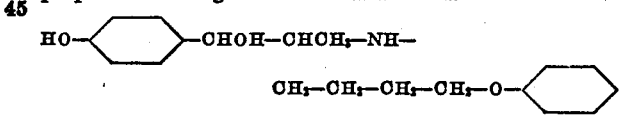

1 - (p - hydroxyphenyl) - 2 - methyl - (1 methyl - $2^1$-p-methoxyphenyloxy ethylamino)-propanol-1 having the formula

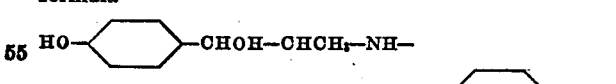

1 - (p - hydroxyphenyl) - 2 - ethyl - 2 - (1' - methyl - 2'-phenoxy)-ethylamino-ethanol-1 having the structural formula

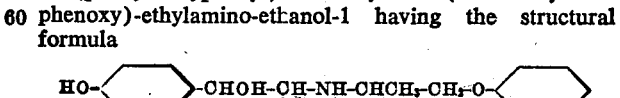

1-(p-benzyloxyphenyl)-2-(1'-methyl - 2' - phenoxy-ethylamino)-propanol-1 having the structural formula

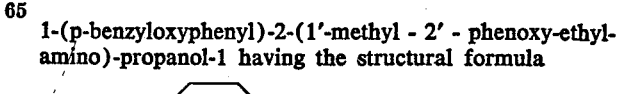

1-(p-methoxyphenyl)-1-(2'-phenoxy-ethylamino)-propane having the structural formula

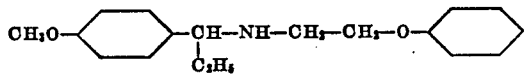

1-(phenyl)-5-(1'-methyl-2'-phenoxy-ethylamino)pentanol-1 having the structural formula

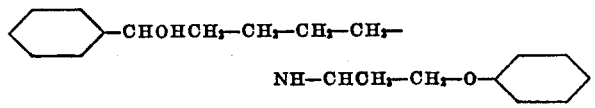

1-(p-methoxyphenyl)-2-(2'-phenoxy-ethylamino)-propanol-1 having the structural formula

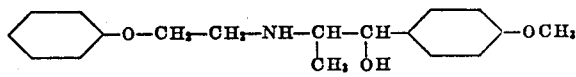

1-(p-hydroxyphenyl)-2-(1'-methyl-2'-p-hydroxyphenoxy ethylamino)propanol-1 having the structural formula

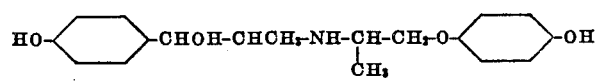

1-(p-methoxyphenyl)-1-(2'-phenoxy-ethylamino)-propanol-2 having the structural formula

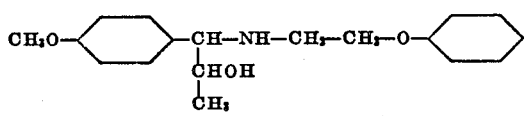

and 1-(p-methoxyphenyl)-1-(1'-methyl-2'-phenoxyethyl)-propanol-2 having the structural formula

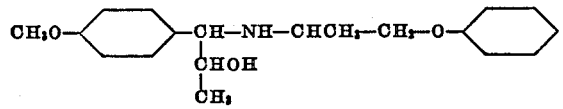

Among these compounds I have found the following to be especially effective vasodilators:

I
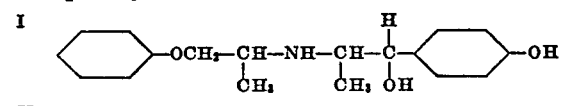

II
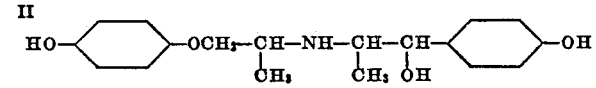

III
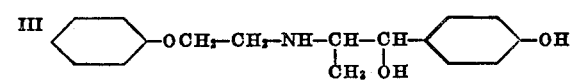

IV
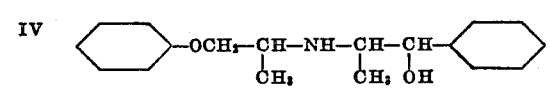

V
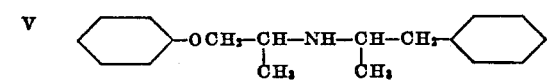

VI
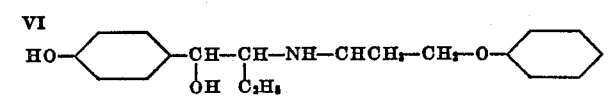

VII
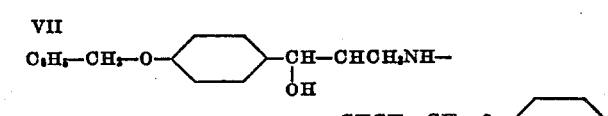

VIII
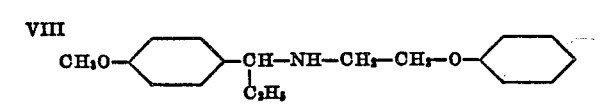

and

IX
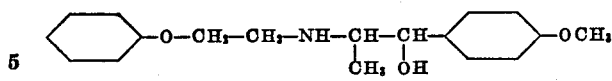

The following table shows the effectiveness of these compounds as compared to the well known vasodilator Dilatol p-hydroxy-N-(1-methyl-3-phenylpropyl) norephedrine

TABLE I

| Compound Number | Percent Increase in Heart Beat Frequency as compared to Dilatol | Percent effectives as vasodilator as compared to Dilatol |
|---|---|---|
| I | 25 | 200–400 |
| II | 6 | 100–200 |
| III | 100–125 | 600–1,600 |
| IV | 3–8 | 40–80 |
| V | 17 | 80–160 |
| VI | 5–10 | 50 |
| VII | ±1 | 10 |
| VIII | ---- | 10 |
| IX | ±1 | 100 |

The novel compounds of this invention may be prepared in several different ways.

Thus according to one method a compound of the general formula

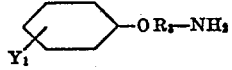

wherein $Y_1$ and $R_3$ have the same meaning as above is caused to react with a compound of the general formula

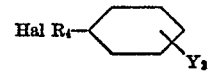

wherein $Y_2$ and $R_4$ have the same meanings as above and Hal represents a halogen such as chlorine or bromine. This reaction is preferably carried out in the presence of a hydrogen halide binding agent which is substantially inert to the reaction components. Such agents may be salts of carbonic acids such as potassium or sodium bicarbonate, tertiary amine bases such as pyridine or collidine or even an excess of the reactant

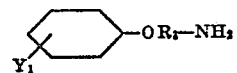

During this reaction $Y_1$ and $Y_2$ when designating hydroxyl groups are preferably protected from entering into the reaction by etherifying or esterifying these groups before the reaction and splitting off the ether or ester group after the reaction has taken place. This splitting off should take place under conditions in which the oxygen bridge between the phenyl nucleus and the group $R_3$ is not interrupted.

An excellent etherification agent is benzyl alcohol and after the reaction is completed the hydroxyl group may be restored by hydrogenating the resultant diaryl amine of the reaction with hydrogen in the presence of a noble metal catalyst such as palladium precipitated on active carbon.

Excellent esterifying agents are acetic acid, toluene sulfonic acid or chloroformic acid ethyl ester. When the product of the reaction is esterified with these agents the hydroxyl groups may be restored by saponification with dilute aqueous solutions of acids such as acetic acid, hydrochloric acid and sulfuric acid or bases such as sodium hydroxide or potassium hydroxide.

In this method of producing those compounds of the invention in which $R_4$ contains a hydroxy group, the reactant

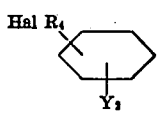

may be employed in which there is a keto group present where a hydroxy group is desired. This keto group is then reduced by hydrogen in the presence of a catalyst such as nickel, platinum or palladium. Alternatively the keto group may be reduced by the method of Meewein-Poundorf, with aluminum amalgam, lithium aluminum hydride or sodium boric anhydride.

An alternative method of preparing the compounds of this invention is to hydrogenize an equimolar mixture of phenoxy alkyl ketone having the formula

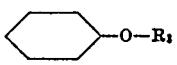

wherein $R_3$ is an alkyl group containing from 2 to 6 carbon atoms and a phenyl-alkylamine, a phenyl-alkanol amine or a phenyl alkyl ketone amine. Thus 1-phenoxy-propanone-2 may be reacted with phenylalkylamines such as 2-phenyl ethylamine-1, 3-phenyl propylamine-1 or 2-phenyl-1-methylethylamine, phenyl alkanol amines such 1-phenyl-2-amino ethanol-1, 1-phenyl-2-amino propanol-1, 1-phenyl 2-amino 2-methyl propanol-1 or 1-phenyl 5-amino pentanol-1 with alkyl ketone or phenyl amines such as 1-p-hydroxyphenyl) 2-amino propanone-1, 1-(p-hydroxyphenyl) 2-amino 2-methylpropanone-1 or 1-(para-hydroxyphenyl) 3-amino butanone-1. Similarly in place of the 1-phenoxy propanone-2 other phenoxy alkyl ketones such as 1-phenoxybutanone-2 or 1-phenoxypropanone-2 may be employed.

Similar hydrogenizing reagents as employed in the previously described method may be employed here. If it is desired to have ester or ether groups in place of hydroxyl groups on the phenyl nuclei the phenyl hydroxy groups may be esterified or etherified.

In cases where a phenyl nucleus of the starting materials contains an ether group and it is desired to convert this to a hydroxy group the hydroxy group may be obtained during this reaction if the hydrogenation is carried out by hydrogen in the presence of a noble metal catalyst.

In cases where the phenyl nuclei contains an ester group saponification to form a desired hydroxy group may be performed after the hydrogenating reaction.

As many of the compounds of the invention have more than one asymmetrical carbon atom more than one racemate is possible for a particular structural formula. Thus the compound of the structural formula

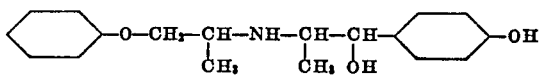

contains three asymmetrical carbon atoms and therefore has four possible racemates. One of the most effective vasodilators of the instant invention in view of its high vasodilating properties and its very low effects on blood pressure and heart beat frequency is the racemate of this compound produced by reacting 2-amino-1-phenoxypropane with 1-(4¹-benzyloxyphenyl)-2-bromine propanone-1 to form 1-(4¹-benzyloxyphenyl)-2(1¹-methyl-2¹-phenoxy ethylamino) propanone-1, hydrogenating this compound or a salt thereof, forming a hydrochloride of this compound and recrystallizing it from water or a mixture of ethanol and diethylene ether.

Specific examples illustrating the methods of preparing the compounds of my invention are as follows:

*Example Ia*

1-(4'-HYDROXYPHENYL)-2 (1'-METHYL-2'-PHENOXY-ETHYLAMINO) PROPANOL-1 HYDROCHLORIDE

To a solution of 30.7 g. (0.203 mol.) of 1-phenoxy-2-aminopropane in 150 ml. of ethanol there was added 31.9 g. (0.100 mol.) of 1-(4'-benzyloxyphenyl)-2-bromine propanone-1. The mixture was heated to boiling temperature and the solution was then refluxed in a reflux condenser for three hours. Most of the ethanol was then distilled off in vacuo. Then to the residue there was added about 150 ml. of diethyl ether. The hydrogen bromine salt of 1-phenoxy-2-aminopropane was filtered off and washed with diethyl ether. The collected ethereal filtrates were acidified with 50 ml. of 4-N-hydrochloric acid and this solution was stirred vigorously. The hydrochloride of 1-(4'-benzyloxyphenyl)-2-(1'-methyl-2'-phenoxy-ethylamino) propanone-1 precipitated out, was filtered off, washed with water and then with diethyl ether. Then this substance was dried in vacuo. The yield was 37.7 g., i.e. 89% of the theoretically possible yield, calculated on 1-(4'-benzyloxyphenyl)-2-bromine propanone-1. This substance had a light yellow color and melted at 197 to 198° C., while decomposing.

*Example Ib*

Then 21.89 g. of the hydrochloride salt obtained in accordance with Example Ia was dissolved in 600 ml. of 80% aqueous ethanol. With the addition of a palladium carbon catalyst, this solution was hydrogenized at room temperature under a hydrogen pressure of about 1.1 atmospheres. After 2 mol. hydrogen had been absorbed, the catalyst was filtered off and the filtrate was evaporated in vacuo until crystallisation occurred. Then the crystals were dissolved by heating in the smallest possible quantity of water and after cooling, the crystallized substance was filtered off, washed with water and dried in vacuo. The yield was 6.80 g., i.e. 39% of the theoretically possible yield. The resultant product recrystallized from water melted at 203 to 204° C.

The ultraviolet absorption spectrum of the substance dissolved in anhydrous ethanol exhibited the following characteristic values:

$$\epsilon(\lambda_{max} \ 2700 \ A.) = 2740$$

$$\epsilon(\lambda_{max} \ 2760 \ A.) = 2900$$

From the hydrochloride the base was made by adding diluted ammonia to an aqueous solution thereof. The base was recrystallized from anhydrous methanol. The base had a melting point of 102.5 to 103.5° C.

*Example II*

1-(4'-HYDROXYPHENYL)-2-(1'-METHYL-2'-PHENOXY ETHYLAMINO)-PROPANOL-1-HYDROCHLORIDE

A solution of 10 g. (0.0235 mol.) of 1-(4'-benzyloxyphenyl)-2-(1'-methyl-2-phenoxyethylamino) propanone-1-hydrochloride obtained in accordance with the Example Ia, in an 80% aqueous ethanol was added to a catalyst, consisting of 0.1 g. of palladium and 1 g. of adsorption carbon. The resultant suspension was hydrogenized until 0.0235 mol. of hydrogen had been absorbed, after which the catalyst was filtered off. The ethanol was distilled off in vacuo and the residue was recrystallized from distilled water. 5.88 g. of 1-(4'-hydroxyphenyl)-2-(1'-methyl-2'-phenoxy ethylamino) propanone-1-hydrochloride were obtained, i.e. 74% of the theoretically possible yield, calculated on the corresponding benzyloxy compound. The absorption spectrum of the substance, dissolved in anhydrous ethanol, exhibited the following characteristic values:

$$\epsilon(\lambda_{max} \ 2870 \ A.) = 17100$$

$$\epsilon(\lambda_{max} \ 2790 \ A.) = 16300$$

The hydrochloric salt of the hydroxy ketone thus produced was hydrogenized in the manner described in Example Ib until 1 gram mol. of hydrogen was absorbed per gram mol. of the compound to be reduced. In a manner similar to that described in the said Example Ib the hydrogenized compound was isolated.

Example III 1-(4'-HYDROXYPHENYL)-2-METHYL-2-(1'-METHYL-2'-PHENOXY ETHYLAMINO) ETHANE HYDROCHLORIDE A solution of 2.82 g. (0.0188 mol.) of 1-(4'-hydroxyphenyl)propanone-2 and 2.88 g. (0.0188 mol.) of 2-amino-1-phenoxy-prepane in 60 ml. of ethanol was hydrogenized, with the addition of 0.10 g. of platinum dioxide catalyst, until 0.0188 mol. of hydrogen had been absorbed. Then the catalyst was filtered off and to the filtrate there was added 9.4 ml. of 2 N-hydrochloric acid. This solution was then evaporated in vacuo until the volume of the residue was 20 ml. This residue was diluted with 30 mls. of water and then extracted with diethyl ether. The solution, remaining after extraction was evaporated in vacuo until the weight of the residue was about 16 grs. This residue was crystallized out at room temperature. The resultant compound 1-(4'-hydroxyphenyl)-2 methyl-2-(1'-methyl-2'-phenoxy-ethylamino) ethane hydrochloride had a melting point of 205 to 207° C.

The absorption spectrum of this substance, dissolved in anhydrous ethanol, exhibited the following characteristic values:

$$\epsilon(\lambda_{max} \ 2700 \ A.) = 2740$$

$$\epsilon(\lambda_{max} \ 2760 \ A.) = 2980$$

Example IV 1-(4'-HYDROXYPHENYL)-2-(1'-METHYL-2'-PHENOXY ETHYLAMINO) PROPANOL-1 HYDROCHLORIDE In the manner described in Example III 3.0 g. (0.020 mol.) of 1-phenoxy-propanone-2 and 3.90 g. (0.020 mol.) of 1-(4'-hydroxyphenyl)-2-amino propanone-1 in an ethanolic solution were hydrogenized until a volume corresponding to 0.040 mol. of hydrogen had been absorbed. The reaction mixture worked up in the same manner as in Example III yielded 0.47 g. (0.0014 mol., i.e. 7%) of 1-(4'-hydroxyphenyl)-2-(1'-methyl-2'-phenoxy ethylamino) propanol-1 hydrochloride.

Example V

1-PHENYL-2-(1'-METHYL-2'-PHENOXY ETHYLAMINO) PROPANOL-1-HYDROCHLORIDE

In the manner described in Example Ia 16 g. (0.047 mol.=24%) of 1-phenyl-2-(1'-methyl-2'-phenoxy ethylamino) propanone-1-hydrochloride were obtained from 42.6 g. (0.200 mol.) of 1-phenyl-2-bromine-propanone-1 and 60.4 g. (0.400 mol.) of 1-phenoxy-2-amino propane. This substance contained 1 mol. of water of hydration and this hydrate melted at about 114° C.

By hydrogenizing 16.9 g. (0.050 mol.) of this substance in the manner described in Example Ib 9.0 g. (0.028 mol.=56%) of 1-phenyl-2-(1'-methyl-2'-phenoxy ethylamino) propanol-1-hydrochloride were obtained. The melting point of this compound was 185 to 187° C.

The ultraviolet absorption spectrum of the anhydrous substance, dissolved in anhydrous ethanol exhibited the following characteristic values:

$$\epsilon(\lambda_{max} \ 2640 \ A.) = 1440$$

$$\epsilon(\lambda_{max} \ 2690 \ A.) = 1760$$

$$\epsilon(\lambda_{max} \ 2750 \ A.) = 1460$$

Example VI 1-(4'-HYDROXYPHENYL)-2-(2'-PHENOXY ETHYLAMINO)-PROPANOL-1-HYDROCHLORIDE According to the method described in Example Ia 8.6 g. (0.021 mol.=42%) of 1-(4'-benzyloxyphenyl)-2-(2'-phenoxy ethylamino) propanone-1 hydrochloride with a melting point of 176 to 177° C. were obtained from 16.0 g. (0.050 mol.) of 1-(4'-benzyloxyphenyl)-2-bromine propanone-1 and 13.9 g. (0.100 mol.) of 2-phenoxy ethylamine.

By hydrogenizing this substance in the manner described in Example Ib 6.15 g. (0.015 mol.) of the aforesaid compound yielded 4.50 g. (0.0132 mol. i.e. 88%) of the compound indicated in the heading of this example. This substance contained 1 mol. of water of hydration and had a melting point range from 133 to 137°. The melting point of the anhydrous substance was 184 to 185° C.

The ultraviolet absorption spectrum of the anhydrous compound, dissolved in anhydrous ethanol exhibited the following characteristic values:

$$\epsilon(\lambda_{max} \ 2700 \ A.) = 2760$$

$$\epsilon(\lambda_{max} \ 2760 \ A.) = 2880$$

Example VII 1-(4'-HYDROXYPHENYL)-2-[1'-METHYL-2'-(4''-HYDROXYPHENOXY) ETHYLAMINO]-PROPANOL-1-HYDROCHLORIDE From 1-(4'-benzyloxyphenoxy) propanone-2 (melting point 76.5 to 77.5°) there was made the oxime (melting point 132 to 133.5°), this substance was then reduced with LiAlH₄ to 1-methyl-2-(4'-benzyloxyphenoxy)-ethylamine-1 (melting point 100 to 103°, melting point of the hydrochloride 205 to 207°).

In accordance with Example Ia 1.95 g. (0.0037 mol.=81%) of 1-(4'-benzyloxyphenyl)-2-[1'-methyl-2'-(4''-benzyloxyphenoxy)ethylamino]propanone-1-hydrochloride were obtained from 1.47 g. (0.0046 mol.) of 1-(4'-benzyloxy-phenyl)-2-bromine-propanone-1 and 2.43 g. (0.0095 mol.) of 1-methyl-2-(4'-benzyloxyphenoxy)-ethylamine. The melting point was 207 to 209°.

The hydrochloric salt of this compound (1.41 g. =0.00265 mol.) was hydrogenized with a palladium carbon catalyst in accordance with Example Ib until 3 mol. of hydrogen had been absorbed per molecule.

In the manner described in Example Ib 0.85 g.=0.00229 mol. in a yield 86% of the hydrochloride of 1-(4'-hydroxyphenyl)-2-[1'-methyl-2'-4''-hydroxyphenoxy)ethylamino]propanol-1 was obtained from the filtrate. This substance contained 1 mol. of water of hydration and did not exhibit a sharply defined melting point.

The ultraviolet absorption spectrum of this substance dissolved in anhydrous ethanol exhibited the following characteristic value:

$$\epsilon(\lambda_{max} \ 2850 \ A.) = 3905$$

Example VIII 1-(3',4'-DIHYDROXYPHENYL)-2-(1'-METHYL-2'-PHENOXY ETHYL AMINO)-ETHANOL-1

To a solution of 39.5 g. (0.26 mol.) of 2-amino-1-phenoxy propane in 60 mls. of anhydrous propanol-2 16.2 g. (0.087 mol.) of 1-(3',4'-dihydroxyphenyl)-2-chlorethanone-1 were added.

This mixture was stirred for one hour at 60 to 65° C. under nitrogen and then 35 mls. of 5 N hydrochloric acid was added to acidify the solution. The propanol-2 was removed by distillation in vacuo and the residue was diluted with distilled water to about 1 litre. This solution was filtered and then evaporated in vacuo to about 100 mls., after which 200 mls. of hydrochloric acid (s.w. 1.19) were added.

Thus 1-(3',4'-dihydroxyphenyl)-2-(2'-phenoxy-1' methylethylamino)ethanone-1 hydrochloride was crystallized out. The crystals were filtered off, washed with water and recrystallized from water. The yield was 11.5 g. (0.034 mol.=39%). The melting point was 188 to 189°.

The ultraviolet absorption spectrum of this substance, dissolved in anhydrous ethanol, exhibited the following characteristic values:

$$\epsilon(\lambda_{max} \ 2250 \ A.) = 17900$$

$$\epsilon(\lambda_{max} \ 2775 \ A.) = 11300$$

$$\epsilon(\lambda_{max} \ 3100 \ A.) = 8650$$

This substance was also made by mixing 17.7 g. (0.043 mol.) of 1-(3',4'-dibenzyloxyphenyl)-2-bromineethanone-1 with 19.6 g. (0.13 mol.) of 2-amino-1-phenoxypropane. The mixture became hot and the bromine compound was dissolved. Then, in the manner described in Example Ia, 1-(3',4'-dibenzyloxyphenyl)-2-(1'-methyl-2'-phenoxyethyl-amino)-ethanone-1-hydrochloride was isolated. Yield 16.0 g.=0.031 mol.=72%. The melting point was 164 to 166°. This substance (10.4 g.=0.020 mol.) was debenzylated by hydrogenizing this substance in ethanol, with the addition of a palladium carbon catalyst, until 0.040 mol. of hydrogen had been absorbed, after which the aforesaid 1-(3',4'-dihydroxyphenyl)-2-(2'-phenoxy-1'-methyl ethyl-amino) ethanone-1-hydrochloride was isolated in the manner described in Example II. The yield was 3.80 g. (0.0113 mol.=56%). The melting point was 186 to 188° C.

3.0 g. (0.0089 mol.) of this compound produced by one of the two preceding methods was dissolved in distilled water and this solution was hydrogenized as described in the preceding examples until the substance had absorbed 0.008 mol. of hydrogen. The catalyst was then filtered off, evaporated to a smaller volume and with the addition of ammonia, the base, 1-(3'-4'-dihydroxyphenyl)-2-(1-methyl-2-phenoxy-ethylamino)ethanol-1 was obtained. The yield was 1.7 g. (0.0056 mol.=63%). The melting point was 85 to 90° C. under decomposition. The absorption-spectrum in anhydrous ethanol exhibited the following characteristics:

$$\epsilon(\lambda_{max}=270\ m\mu)=3070$$
$$\epsilon(\lambda_{max}=276\ m\mu)=3830$$

The novel compounds of my invention may be compounded to form drops and tablets for oral use and injection liquids.

The drops may be produced for example by dissolving a compound of my invention along with sodium bisulfite, methyl paroxybenzoate, propyl paroxybenzoate and a small quantity of 96% aqueous ethanol in distilled water.

The tablets may be produced for example from a mixture of a compound of my invention along with milk sugar, potato starch, sugar and talcum.

The injection liquids may be produced for example by mixing a compound of my invention along with glycerin, sodium metabisulphite and distilled water.

While I have described my invention in connection with specific embodiments and applications, other modifications thereof will be readily apparent to those skilled in this art without departing from the spirit and scope of the invention as defined in the appended claims.

What I claim is:
1. A member selected from the group consisting of the compounds of the formulae:

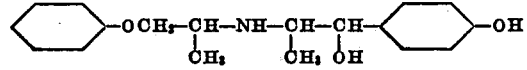

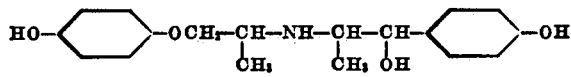

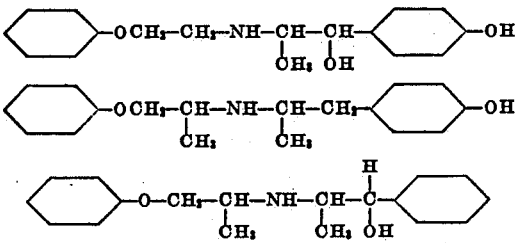

and the hydrochloride salts thereof.

2. A member selected from the group consisting of a compound having the formula:

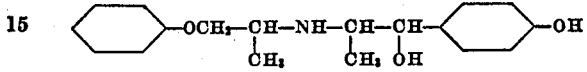

and the hydrochloride salt thereof.

3. A member selected from the group consisting of a compound having the formula:

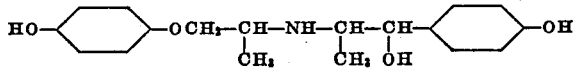

and the hydrochloride salt thereof.

4. A member selected from the group consisting of a compound having the formula:

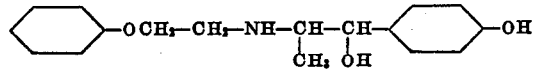

and the hydrochloride salt thereof.

5. A member selected from the group consisting of a compound having the formula:

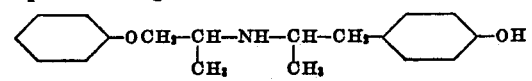

and the hydrochloride salt thereof.

6. A member selected from the group consisting of a compound having the formula:

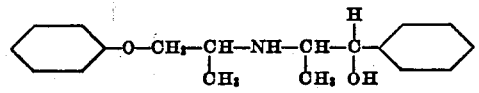

and the hydrochloride salt thereof.

References Cited in the file of this patent

UNITED STATES PATENTS

| | | |
|---|---|---|
| 2,217,660 | Alquist et al. | Oct. 15, 1940 |
| 2,252,828 | Alquist et al. | Aug. 19, 1941 |
| 2,308,232 | Scheuing et al. | Jan. 12, 1943 |
| 2,661,373 | Kulz | Dec. 1, 1953 |
| 2,679,501 | Wenner | May 25, 1954 |

FOREIGN PATENTS

| | | |
|---|---|---|
| 136,721 | Sweden | July 29, 1952 |
| 800,718 | Great Britain | Sept. 3, 1958 |
| 92,894 | Norway | Sept. 27, 1958 |

UNITED STATES PATENT OFFICE
CERTIFICATE OF CORRECTION

Patent No. 3,056,836                      October 2, 1962

Hendrik Durk Moed

It is hereby certified that error appears in the above numbered patent requiring correction and that the said Letters Patent should read as corrected below.

Column 1, lines 23 to 25, the formula should appear as shown below instead of as in the patent:

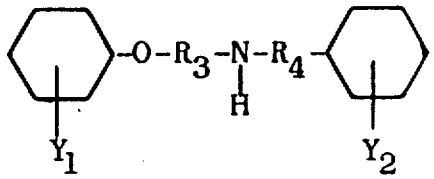

same column 1, line 30, for "$Y_3$ and $Y_4$" read -- $Y_1$ and $Y_2$ --; line 34, for "$Y_3$, $Y_4$" read -- $Y_1$, $Y_2$ --; column 2, line 11, for "$Y^1$ methyl-$2^1$" read -- $1'$methyl-$2'$ --; line 16, for "$1^1$-methyl-$2^1$" read -- $1'$-methyl-$2'$ --; lines 20 to 22, the formula should appear as shown below instead of as in the patent:

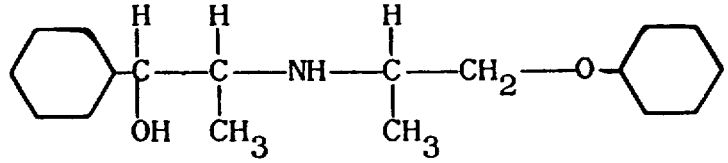

line 23 for "$2^1$" read -- $2'$ --; lines 25 to 27, the formula should appear as shown below instead of as in the patent:

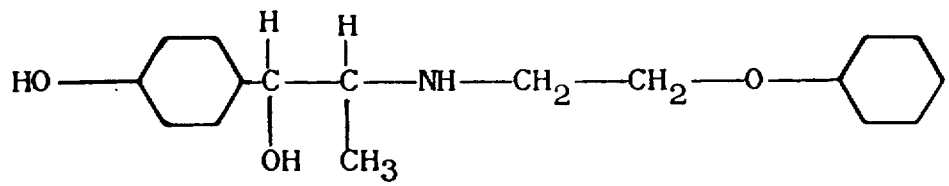

line 29, for "$1^1$-methyl-$2^1$" read -- $1'$-methyl-$2'$ --; line 35, for $1^1$-methyl-$2^1$" read -- $1'$-methyl-$2'$ --; line 43, for "$4^1$"

3,056,836 read -- 4' --; same column 2, line 50, for "2¹" read -- 2' --; column 5, lines 63 and 64, for "4¹", each occurrence read -- 4' --; line 64, for 1¹-methyl-2¹" read -- 1'-methyl-2' --; column 6, line 28, for "crystallisation" read -- crystallization --; column 7, line 6, for "prepane" read -- propane --; column 8, line 44, for "3905" read -- 3950 --.

Signed and sealed this 28th day of May 1963.

(SEAL)
Attest:

ERNEST W. SWIDER
Attesting Officer

DAVID L. LADD
Commissioner of Patents